(No Model.)
A. B. CALKINS.
POLAR PLANIMETER.
No. 458,968. Patented Sept. 1, 1891.
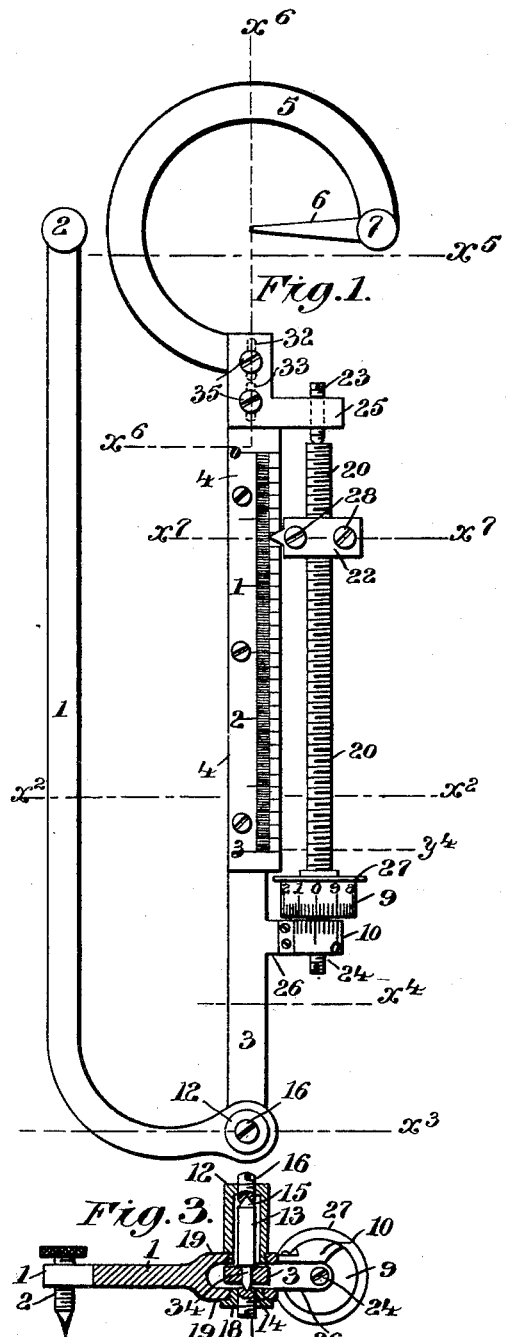
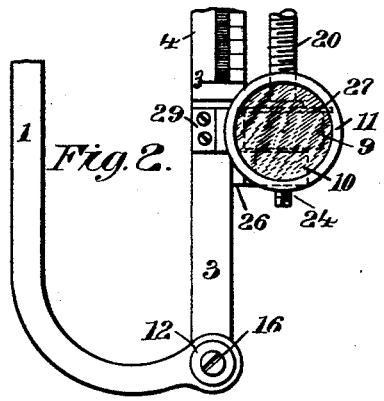
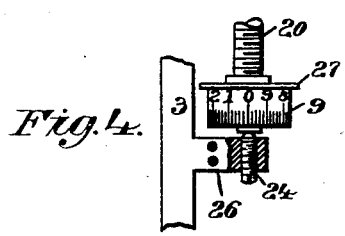
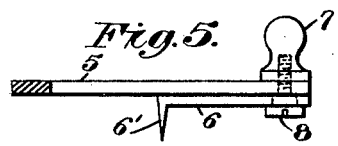
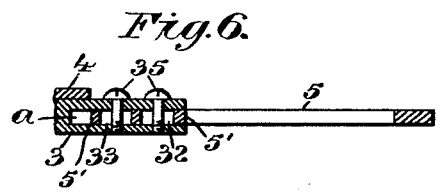
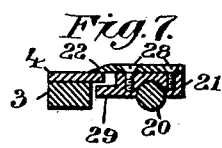
Witnesses
Inventor
Almon B. Calkins
By George D. Phillips
Attorney

UNITED STATES PATENT OFFICE.

ALMON B. CALKINS, OF NEW YORK, N. Y., ASSIGNOR OF ONE-HALF TO FERRAL C. DININNY, JR., OF SAME PLACE.

POLAR PLANIMETER.

SPECIFICATION forming part of Letters Patent No. 458,968, dated September 1, 1891.

Application filed February 26, 1891. Serial No. 382,967. (No model.)

*To all whom it may concern:*

Be it known that I, ALMON B. CALKINS, a citizen of the United States, and a resident of New York, in the county of New York and State of New York, have invented certain new and useful Improvements in Polar Planimeters, of which the following is a specification.

My invention relates to planimeters, an instrument used in measuring and calculating the areas of regular or irregular plain figures.

The object of my invention is to enlarge the scope or capacity of the planimeter, whereby large areas may be traced and measured, or a large number of areas may be aggregated in consecutive order—such as maps, plans, plots, continuous steam-engine, indicator diagrams—and the result accurately taken.

Heretofore planimeters have been constructed with a beam having at one end a tracing-point and at or near the other end of such beam a graduated measuring-wheel, the tracing-point following the outlines of a figure, while the wheel by contact with the surface of the paper will revolve, and by means of the graduations on such wheel the exact area of a figure can be taken. The instrument as at present constructed is very unsatisfactory, owing to the limited capacity of the measuring-wheel, compelling the operator to watch both the tracing-point and wheel. As such tracing-point should occupy the whole attention of the operator, the number of revolutions of the measuring-wheel cannot always be carefully noted and a wrong calculation is the result, therefore frequent interruptions in tracing is necessary in order to note the reading of the wheel, making thereby a long and tedious operation, thus rendering the instrument impracticable in measuring diagrams of large areas which exceed the capacity of the measuring-wheel. The upper part of the tracing-point projecting through the beam is provided with a thumb-piece, by means of which the planimeter is guided around the outline. This brings the hand directly over such point, which point is also covered with the beam, thus casting a dark shadow on the tracing-point, making it difficult to follow the outline of a figure.

My invention consists in attaching the measuring-wheel rigidly to one end of a threaded shaft, a graduated scale placed longitudinally therewith, a threaded pointer engaging the threaded shaft and carried by the same over the graduated scale to record the revolutions of the measuring-wheel, the tracing-pointer being so placed that a full unobstructed view may be had of its engagement with the diagram, a frictionless joint connecting the arm and beam, an eyeglass attached to the beam and overlooking the wheel to read the vernier measurements, all of which improvements will be more fully described in the specification, and particularly pointed out in the claims.

To more fully understand my invention, reference is had to the accompanying drawings, and to the figures and letters thereon, forming a part of this specification.

Figure 1 represents a plan view of the instrument. Fig. 2 represents a broken plan view of the beam, its arm, wheel, and shaft through dotted line $X^2$ of Fig. 1. Fig. 3 represents a sectional end elevation of the frictionless joint of the beam and arm through dotted line $X^3$ of Fig. 1. Fig. 4 represents a plan view of the measuring-wheel and a projection of the beam, to which one end of the shaft is pivoted through line $X^4$ of the beam and $y^4$ of the shaft and beam with scale removed of Fig. 1. Fig. 5 represents a broken end elevation of the upper curved end of the instrument through line $X^5$ of Fig. 1, showing, also, the manner of securing the pointer to such end. Fig. 6 represents a sectional side elevation of the beam, scale, and shank of the curved end through line $X^6$ of Fig. 1. Fig. 7 represents a sectional end elevation of the beam, graduated-scale pointer, and threaded shaft through line $X^7$ of Fig. 1.

Its construction and operation are as follows: 1 represents the arm; 2, pointed stud in one end of such arm to secure it in a fixed position; 3, beam; 4, graduated scale on such beam; 5, curved end secured to such beam; 6, tracing-pointer arm; 6', tracing-point secured by thumb-piece 7 and screw 8 to such curved end; 9, measuring-wheel; 10, vernier attachment connected with such wheel; 11, eyeglass attached to beam 3; 12, housing of the frictionless joint; 13, upright shaft in such housing, which shaft supports the beam 3, the pointed ends 14 and 15 of which shaft are pivoted in the screws 16 and 17; 18, threaded bushing secured to lower forked end 19 of arm 1, the central hole of such bushing also threaded to receive screw 17; 20, threaded shaft; 21, threaded traveler engaging such shaft; 22, pointer attached to such traveler and caused to move over the face of scale 4. The threaded shaft 20, (see Fig. 1,) on one end of which is firmly secured the measuring-wheel 9, is journaled on the fine center-points of the screws 23 and 24, which screws are situated in the projections 25 and 26 of the beam 3. The thin traction edge or rim 27 of wheel 9 projects slightly above such wheel and forming thereby a contact with the surface over which the wheel moves, and by such contact such wheel and shaft are caused to revolve. The pitch of the threaded shaft 20 is fifty per inch. The circumference of the wheel is divided into ten equal parts and these subdivided into still finer parts. The circumference of the wheel is such that its full value or one revolution of such wheel represents ten square inches. The inches on scale 4 are subdivided into tenths and fiftieths. The threaded traveler 21 (see Fig. 7) is forked, and the upper threaded portion of such fork only engaging shaft 20, the weight of such traveler being reduced to a minimum, it has little or no frictional contact with such shaft, and consequently will not impede its motion. The pointer 22 is attached to traveler 21 by screws 28. The lip 29 of the traveler projects under the scale 4, and this, together with pointer 22, will prevent the traveler 21 becoming displaced by the rotative action of the shaft 20. The shank 5' of the upper curved piece 5 (see Fig. 6) is inserted into the forked opening a of beam 3 and held firmly onto the shank 5' of such curved end by screws 35. The holes 32 and 33 for such screws are elongated, so that the proper relation of the length of the beam to the value of the wheel can be determined. The tracing-point 6', (see Fig. 1,) which is projected within the curve of end 5, carries such point far enough away from the thumb-piece 7, so as to give a full view of such point and the diagram during the operation of tracing.

The construction of the frictionless joint uniting arm 1 and beam 3 is as follows: The beam 3 (see Fig. 3) is firmly mounted on the reduced portion 34 of the shaft 13, and within the forked end 19 of arm 1 the ends 14 and 15 of such shaft are finely pointed and such points journaled in the ends of screws 16 and the proper tension on the shaft being regulated by means of such screws. The upper screw 16 is fitted to the top of the housing 12. The lower end of such housing is threaded and fits a threaded hole in the upper fork of the arm 1. The interior of the housing is made larger than shaft 13, so as to give free play to the same. The threaded bushing 18, which is fitted to the lower fork of arm 1, carries the screw 17. The object of the bushing 18 is to admit the shaft 13 within the housing when the parts are being assembled. To apply the instrument, the pointed stud 2 (see Fig. 1) of arm 1 is secured to the surface of the board on which the diagram is placed. The tracing-point 6' is placed on the line of such diagram, the operator guiding the instrument by means of the thumb-piece 7. The wheel 9 having been previously set at zero, the instrument will swing on the frictionless joint and also around the point 2 while the tracing-point is following the diagram. One revolution of the wheel 9 will move the pointer 22 along scale 4 one-fiftieth of an inch, equal to the pitch of shaft 20, as such scale 4 is three inches in length, and it is capable of showing one hundred and fifty revolutions of wheel 9, and as each revolution of such wheel, as before mentioned, will equal ten square inches, the total area represented by the scale will be fifteen hundred inches. Thus large areas can be measured or an aggregation of a large number of areas while the whole attention of the operator is confined to the tracing-point.

It is evident that some of the details of construction may be somewhat changed or modified without departing from the spirit of my invention—such, for instance, as the shaft 13 in the frictionless joint connecting the arm and beam. In the drawings the ends of such shaft are pointed, and such points journaled in screws 16 and 17 it would be equally advantageous to point such screws and journal in the shaft. The ends of the beam may be forked instead of the arm and the shaft secured thereto; also, in the manner of connecting the traveling pointer to the threaded wheel-shaft, as well as the exact shape of the curved end 5, to which the tracing-point is attached.

Having thus described my invention, what I claim, and wish to secure by Letters Patent, is as follows:

1. As an improvement in polar planimeters, the combination, with a movable beam, of a graduated scale attached to such beam, a threaded shaft carrying a graduated measuring-wheel journaled to such beam, and a threaded traveler carrying an indicating-finger engaging with such threaded shaft and moved by the same along the graduated scale to record on such scale the revolutions of the measuring-wheel, substantially as described.

2. The combination, in a polar planimeter, of a movable beam, a graduated scale thereon, a threaded shaft carrying a graduated measuring-wheel, such shaft placed parallel with such scale and journaled to said beam, and a threaded pointer engaging the threaded shaft and the graduated scale with a tracing-point holder adjustably attached to the beam, the tracing-point placed within the curve of such holder, so as to give a free unobstructed view of such tracing-point, substantially as set forth.

3. The combination, in a polar planimeter, of a movable beam carrying a graduated scale, a threaded shaft carrying a graduated measuring-wheel and pointer and means to connect such pointer to the shaft, and a tracing-point adjustably connected with the beam with an arm pivoted to such beam and means to secure the free end of such arm in a fixed position, substantially as set forth.

4. The combination, in a polar planimeter, of the movable beam, a graduated scale thereon, a threaded shaft carrying a graduated measuring-wheel journaled to such shaft, an indicating-pointer for such scale and means to connect such pointer to the shaft, and an eyeglass attached to the beam and overlooking the measuring-wheel, substantially as set forth.

5. In a polar planimeter, to form a connection for the beam and arm, the combination of the following parts, to wit: a shaft rigidly attached to the beam, the ends of such shaft journaled in bearings, and means to adjust such bearings with relation to the ends of the shaft, so that the beam may move freely thereon, substantially as set forth.

6. In a polar planimeter, to form a connection for the beam and arm, the combination of the following parts, to wit: the shaft 13, attached to beam 3, screws 16 and 17, to which such shaft is journaled, housing 12, enveloping the shaft and to which screw 16 is adjustably connected, and means to attach the housing to the arm, substantially as set forth.

Signed at New York, in the county of New York and State of New York, this 13th day of May, A. D. 1890.

ALMON B. CALKINS.

Witnesses:
WILLIAM MOLLOY,
CHAS. A. RILEY.